United States Patent [19]

Breininger

[11] Patent Number: 4,948,632

[45] Date of Patent: Aug. 14, 1990

[54] ALKYTINFLUORIDE COMPOSITION FOR DEPOSITION OF TIN OXIDE FILMS

[75] Inventor: J. Shannon Breininger, Gibsonia, Pa.

[73] Assignee: PPG Industries, Inc., Pittsburgh, Pa.

[21] Appl. No.: 736,605

[22] Filed: May 21, 1985

[51] Int. Cl.$^5$ .................. C23C 16/00; C08L 95/00; C09D 3/24
[52] U.S. Cl. .............................. 427/255; 106/287.19; 423/492; 427/168; 427/248.1; 427/314; 556/81; 556/98
[58] Field of Search ............... 427/226, 180, 168, 314, 427/248.1, 255, 8; 260/429.7; 65/60.52; 556/95

[56] References Cited

U.S. PATENT DOCUMENTS

| | | | |
|---|---|---|---|
| 4,240,816 | 12/1980 | McMaster et al. | 427/168 |
| 4,263,335 | 4/1981 | Wagner et al. | 427/168 |
| 4,325,988 | 4/1982 | Wagner | 427/168 |
| 4,344,986 | 8/1982 | Henery | 427/168 |
| 4,397,671 | 8/1983 | Vong | 427/168 |
| 4,401,695 | 8/1983 | Sopko | 427/168 |
| 4,533,571 | 8/1985 | Kramer et al. | 427/180 |
| 4,562,095 | 12/1985 | Coulon et al. | 427/180 |

*Primary Examiner*—Norman Morgenstern
*Assistant Examiner*—Sadie Childs
*Attorney, Agent, or Firm*—Donna L. Seidel

[57] ABSTRACT

A method for selecting preferred coating reactants by thermal analysis of decomposition is disclosed along with a preferred coating reactant comprising dibutyltin difluoride in polymolecular form.

4 Claims, 2 Drawing Sheets

FIG. 1 – CALORIMETRIC ANALYSES

FIG.2 – CALORIMETRIC ANALYSES

FIG.3 – THERMOGRAVIMETRIC ANALYSES

FIG.4 – X-RAY DIFFRACTION ANALYSES

ALKYTINFLUORIDE COMPOSITION FOR DEPOSITION OF TIN OXIDE FILMS

BACKGROUND

The present invention relates generally to the art of depositing tin oxide films, and more particularly to the art of depositing low resistivity tin oxide films by thermal decomposition of alkyltinfluoride compositions.

Gillery U.S. Pat. No. 3,677,814 teaches a process for forming electroconductive tin oxide films by pyrolyzation of organic tin compounds which have direct tin-fluoride bonds, e.g., dialkyltin difluorides. Preferably a solution of 10 to 65 percent by weight dialkyltin difluoride in a polar solvent is applied to the surface of a refractory substrate at a temperature greater than about 400° F. (about 204° C.). Spraying a solution comprising 450 grams per liter dibutyltin difluoride, 155 milliliters per liter of triethylamine solvating agent and the balance methanol solvent onto a sheet of clear glass heated to about 1300° F. (about 704° C.) produces a tin oxide film about 270 nanometers thick which contains no haze or texture and exhibits a resistivity of about 15 to 20 ohms per square.

Wagner U.S. Pat. No. 4,322,363 teaches a method for making dibutyltin difluoride by reacting dibutyltin diacetate with hydrogen fluoride in water or methanol.

It has been postulated that dibutyltin difluoride may have a quasioctahedral symmetry structure around the metal atom with bridging fluorines giving rise to a two-dimensional polymeric network in which the trans-butyl groups lie along a local four fold rotational axis through the metal atom.

SUMMARY

The present invention results from the discovery that alkyltin fluorides exist in various forms which differ in their ability to produce tin oxide films of minimum resistivity. The primary form of an alkyltin fluoride comprises discrete molecules of the formula $R_x Sn F_{(4-x)}$ wherein x is 1, 2 or 3. Alkyltin fluorides in this form produce tin oxide films of a characteristic resistivity for a given film thickness under a specific set of reaction conditions. However, alkyltin fluorides may also be produced in more complex forms wherein two or more molecules are associated in a polymolecular structure having the formula $[R_x Sn F_{(4-x)}]_y$ wherein x is 1, 2 or 3 and y is greater than 1. The present invention involves identifying and utilizing alkyltin fluoride compositions which comprise a preferred ratio of monomolecular to polymolecular species.

BRIEF DESCRIPTION OF THE DRAWING

FIG. 1 illustrates the results of calorimetric analyses, using a Mettler TA 3000 System, of four batches of dibutyltin difluoride.

DETAILED DESCRIPTION OF THE PREFERRED EMBODIMENT

A substrate to be coated, preferably a sheet of glass, more preferably a continuous float glass ribbon, is maintained in a coating environment, preferably in a horizontal position. The environment comprises an oxidizing atmosphere and sufficient heat to thermally decompose an alkyltin fluoride composition to deposit a tin oxide film on the substrate surface. The fluorine in the coating composition results in a fluorine-doped tin oxide film which has higher electrical conductivity than an undoped tin oxide film.

The coating reactant is obtained in powder form, preferably of fairly uniform particle size distribution of about 500 to 600 microns diameter or less. Alkyltin fluorides such as dimethyltin difluoride and preferably dibutyltin difluoride are employed in accordance with the present invention. The powder coating reactant is mixed with a carrier gas, preferably air, and preferably at ambient temperature. The powder coating reactant may be injected, blown or aspirated into the carrier gas stream. While any means for mixing the powder coating reactant and the carrier gas may be employed, a screw-feeder is particularly suitable for metering the powder coating reactant into a vacuum ejector which delivers the powder coating reactant at a uniform controlled rate to a jet mill which effectively reduces the average particle size of the powder coating reactant to a smokelike 0.5 to 1.2 micron by means of impingement of the particles and centrifugal air forces created within the jet mill. The fine milled powder is then transferred in air from the jet mill to the main transport air duct for turbulent mixing with high volume, low pressure carrier gas.

The carrier gas may be maintained at any temperature below the decomposition temperature of the coating reactant, preferably below its vaporization temperature, and most preferably ambient temperature, thereby minimizing the risks of coating reactant decomposition which can decrease the efficiency of deposition methods. High volumes of carrier gas, preferably air, are delivered by means of a blower typically of the type used for tempering glass. Such blowers are capable of delivering air at volumes of several hundred cubic feet per minute and low pressures, preferably less than 1 pound per square inch, creating high velocity turbulent air flow through delivery ducts. The distribution of powder coating reactant in the carrier gas is kept substantially homogeneous en route to the substrate by turbulent flow of the carrier gas/coating reactant mixture. In addition, little or no particulate coating reactant accumulates on the duct walls.

The uniform mixture of powder coating reactant and carrier gas is delivered at low pressure to the surface to be coated through a slot-type nozzle, defined for purposes of the present invention as having a length substantially greater than its width. The large volume air flow assures uniform distribution of high velocities across the length of the nozzle. The slot opening is preferably no more than ⅛ inch wide, and preferably is as long as the parallel dimension of the surface to be coated to enhance the uniformity of the coating. The slot is preferably disposed perpendicular to the direction of relative motion between the nozzle and the surface to be coated. A large stationary substrate may be coated by using one or more moving nozzles, or the substrate may travel past one or more stationary nozzles. The nozzle is preferably positioned less than 2 inches (about 5.1 centimeters) from the surface to be coated, preferably 0.5 to 1.5 inch (1.2 to 3.8 centimeters), thereby creating a slight back pressure that promotes uniform flow of the carrier gas/coating reactant mixture along the length of the slot to further enhance the uniformity of the coating. The high velocities, preferably greater than 2500 feet (762 meters) per minute, created as the large volume of powder/air mixture exits the nozzle maintain turbulent flow and, therefore, uniform distribution of coating reactant.

In a preferred embodiment of the present invention, a freshly formed float glass ribbon travels at a line speed of about 270 inches per minute (about 6.9 meters per minute) past a stationary coating apparatus. Powder dibutyltin difluoride coating reactant having an average particle size of about 500 microns is reduced to about 0.5 to 1.2 micron in a jet mill and fed at a rate of about 200 grams per minute into a stream of air delivered at a rate of about 410 cubic feet (11.3 cubic meters) per minute and a pressure of about 0.4 pounds per square inch. The powder/air mixture is delivered through a slot-shaped nozzle 1/16 inch (about 1.6 millimeters) wide and 6 feet (about 1.8 meters) long at a velocity of about 6000 to 6500 feet (about 1800 to 2000 meters) per minute. The nozzle is positioned 1.5 inches (about 3.8 centimeters from the glass surface to provide a back pressure which helps to maintain uniform distribution of the powder coating reactant. The glass surface is at a temperature of about 1050° F. (about 566° C.). A uniform tin oxide coating is deposited on the glass surface. With all of the coating process conditions constant, and a constant feed rate of 17 pounds an hour of dibutyltin difluoride, the resulting film thickness and conductivity should remain the same. However, the conductivity of the resulting tin oxide film was found to vary with different batches of dibutyltin difluoride.

Various batches of dibutyltin difluoride may be loosely divided into three categories. The first category is unacceptable, i.e., dibutyltin difluoride which does not produce a tin oxide film of acceptably low resistivity, preferably less than 50 ohms per square, at normal float line coating temperatures. The second category is marginal, i.e., dibutyltin difluoride which produces a tin oxide film of marginally acceptable low resistivity under standard operating procedures but which can be made to produce a tin oxide film of acceptably low resistivity by altering the standard operating procedures, e.g., contacting the glass surface with the dibutyltin difluoride at a higher temperature. The third category is acceptable, i.e., dibutyltin difluoride which consistently produces a tin oxide film of acceptably low resistivity under standard operating procedures.

The differences between acceptable and unacceptable batches of dibutyltin difluoride are not accounted for by impurities. Infrared spectroscopy and elemental analysis indicate that all batches tested consist essentially of dibutyltin difluoride with no detectable differences in composition which could account for the differences in performance. However, thermal analyses, performed with a Mettler TA 3000 System, and low angle X-ray diffraction analysis reveal differences as illustrated in FIGS. 1, 2, 3 and 4.

Unacceptable batches of dibutyltin difluoride are characterized by calorimetric analysis as having a single endotherm at about 160° C. as shown in FIGS. 1(*a*) and 2(*a*), by thermogravimetric analysis as having a single decomposition temperature at about 280° C. as shown in FIG. 3(*a*), and by low angle X-ray diffraction analysis as having a single crystal structure represented by a single peak at about 6.6° as shown in FIG. 4(*a*). These single peaks are believed to represent dibutyltin difluoride in a monomolecular structure.

Marginal batches of dibutyltin difluoride are characterized by calorimetric analysis as having a significant secondary endotherm at about 150° C. distinguished from a primary endotherm at about 160° C. as shown in FIGS. 1(*b*) and 2(*b*); by thermogravimetric analysis as having a primary decomposition temperature of about 290° C. as shown in FIG. 3(*b*); and by X-ray diffraction analysis as having two distinct crystalline species represented by distinct peaks at about 6.59 and 6.74° as shown in FIG. 4(*b*). The additional peak is believed to represent a significant proportion of dibutyltin difluoride as polymolecular species.

Acceptable batches of dibutyltin difluoride are characterized by calorimetric analysis as having a substantial secondary endotherm at about 145° C. distinguished from a primary endotherm at about 160° C. as shown in FIGS. 1(*c*) and 2(*c*), by thermogravimetric analysis as having a primary decomposition temperature of about 300° as shown in FIG. 3(*c*); and by X-ray diffraction analysis as having two distinct crystalline species represented by distinct peaks at 6.54 and 6.90° as shown in FIG. 4(*c*). The additional peak is believed to represent a substantial proportion of dibutyltin difluoride as polymolecular species.

Figure 1A:
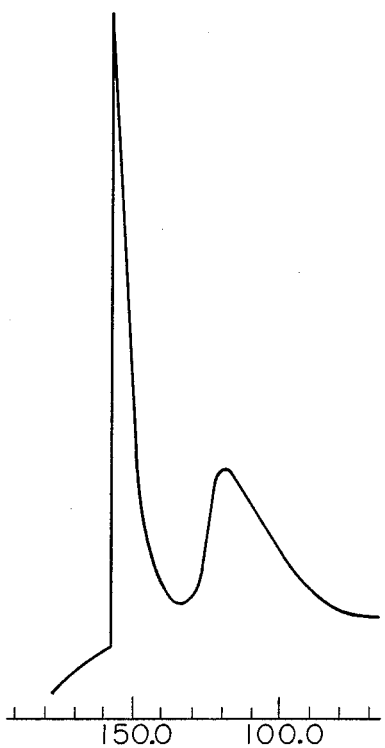
FIG. 1(a) represents a batch of dibutyltin difluoride comprising essentially a single species of dibutyltin difluoride represented by a single peak labled A.
Figure 1B:
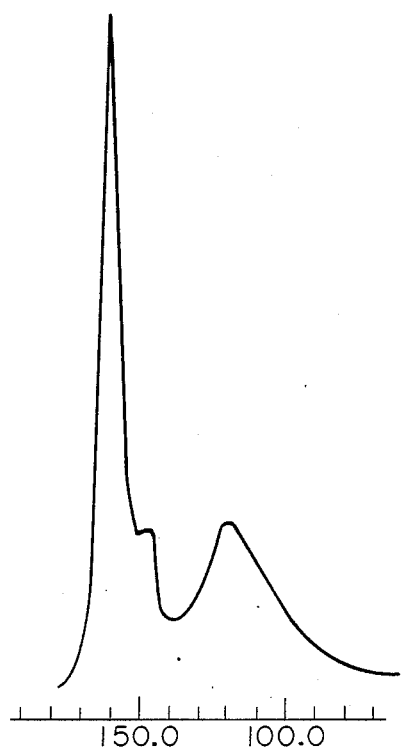
FIG. 1(b) represents a batch of dibutyltin difluoride comprising a significant proportion of a second species of dibutyltin difluoride represented by a significant secondary peak labeled B.
Figure 1C:
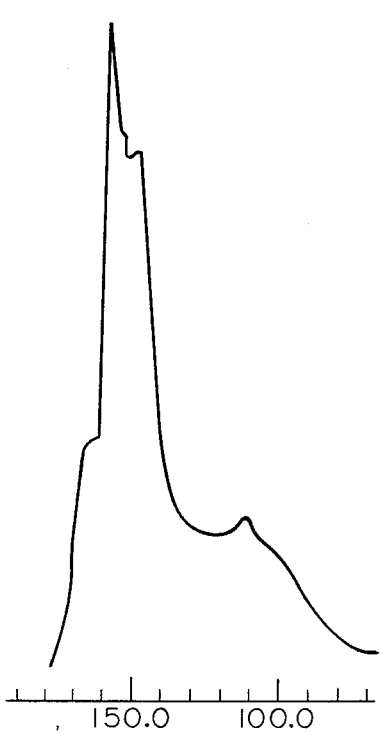
FIG. 1(c) represents a batch of dibutyltin difluoride comprising a substantial proportion of a second species of dibutyltin difluoride represented by a substantial secondary peak labeled B.
Figure 1D:
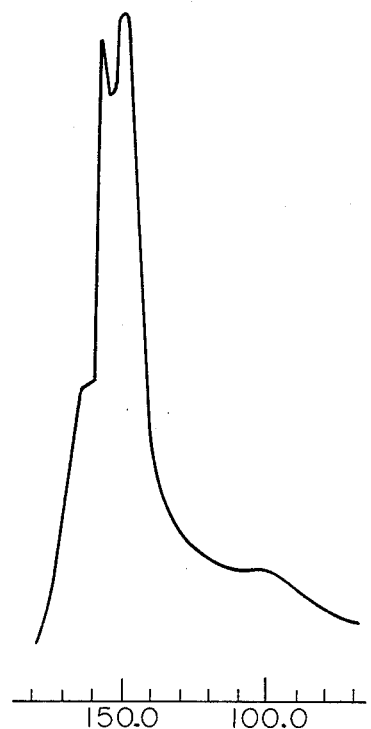
FIG. 1(d) represents a batch of dibutyltin difluoride comprising a major proportion of a second species of dibutyltin difluoride as represented by peak B being larger than peak A.

Undesirable batches of dibutyltin difluoride are characterized by calorimetric analysis as in FIG. 1(d). Batches having the major endotherm peak at the lower temperature are found to be waxy, and undesirable because the material clogs the coating apparatus.

The present invention will be further understood from the descriptions of specific examples which follow.

EXAMPLE I

Figure 2A:
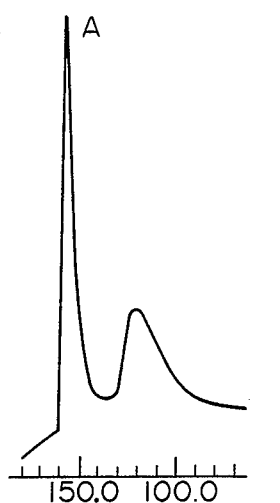
FIG. 2(a) illustrates calorimetric analysis between 70° C. and 180° C. of a sample of dibutyltin difluoride essentially in the primary form of monomolecular species represented by the single peak A.
Figure 3A:
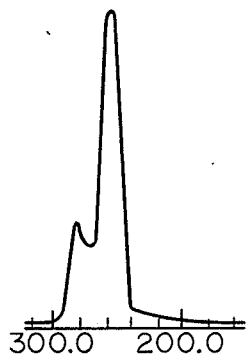
FIG. 3(a) illustrates thermogravimetric analysis between 160° C. and 320° C. of a sample of dibutyltin difluoride essentially in the primary form of monomolecular species represented by a decomposition temperature peak at 280° C.
Figure 4A:
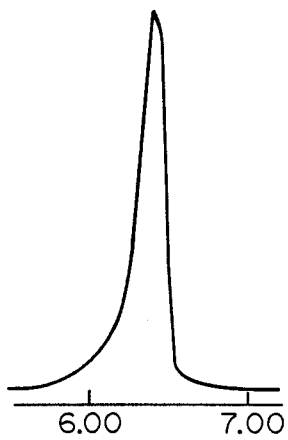
FIG. 4(a) illustrates X-ray diffraction analysis of dibutyltin difluoride comprised essentially of the monomolecular species represented by the single peak A.

A freshly formed float glass ribbon travels at a line speed of about 300 inches per minute (about 7.6 meters per minute) past a stationary coating apparatus. Dibutyltin difluoride in powder from having an average particle size of about 500 microns is processed through a jet mill to reduce the particle size to about 1 micron or less. The fine powder dibutyltin difluoride is fed at a rate of 17 pounds per hour (about 129 grams per minute) into a stream of air delivered at a rate of about 600 cubic feet (8.5 cubic meters) per minute at a pressure of about 0.4 pounds per square inch. The dibutyltin difluoride powder is delivered to the surface of the glass which is at a temperature of about 1180° F. (about 638° C.). A uniform tin oxide coating is formed on the glass surface. The tin oxide film has an apparent thickness of about 1600 Angstroms as evidenced by a second order blue interference color observed by reflectance, and has a resistivity of about 50 to 55 ohms per square. This resistivity is higher than is desirable for a low emissivity infrared reflective film. X-ray diffraction analysis of the dibutyltin difluoride reveals that the coating reactant comprises a single species as shown in FIG. 4(a). Calorimetric analysis reveals a single endotherm at about 160° C. as shown in FIG. 2(a), while thermogravimetric analysis reveals a single decomposition temperature of about 280° C. as shown in FIG. 3(a). This batch of dibutyltin difluoride is believed to consist essentially of molecular dibutyltin difluoride.

EXAMPLE II

Figure 2B:
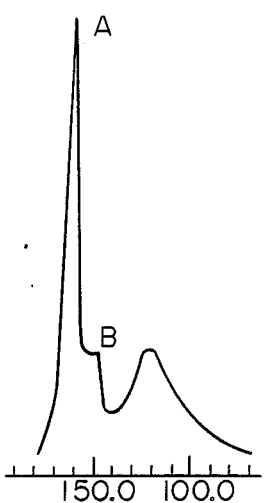
FIG. 2(b) illustrates calorimetric analysis between 70° C. and 180° C. of a sample of dibutyltin difluoride which comprises a significant proportion of polymolecular species represented by secondary peak B distinguished from primary peak A.
Figure 3B:
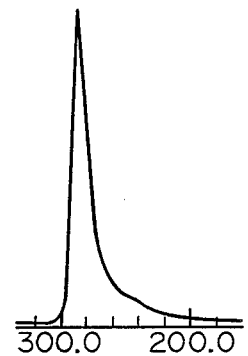
FIG. 3(b) illustrates thermogravimetric analysis between 160° C. and 320° C. of a sample of dibutyltin difluoride which comprises a significant proportion of polymolecular species represented by a decomposition temperature peak at about 290° C.
Figure 4B:
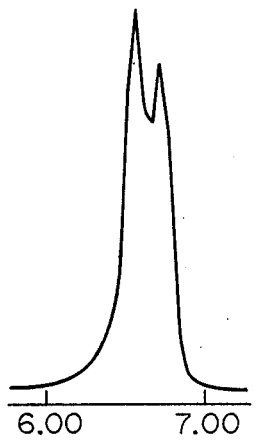
FIG. 4(b) illustrates X-ray diffraction analysis of a sample of dibutyltin difluoride comprising a significant proportion of polymolecular species represented by secondary peak B distinguished from peak A.

A float glass ribbon is coated with a fluorine-doped tin oxide film as in Example I under identical coating conditions except with a different batch of dibutyltin difluoride. A uniform tin oxide coating is deposited on the glass surface. The tin oxide film has an apparent thickness of about 1600 Angstroms as evidenced by a second order blue interference color in reflectance. However, in contrast to the resistivity of 50 to 55 ohms per square for the film of Example I, the resistivity of the tin oxide film in this Example is 47 to 52 ohms per square. Analysis of the dibutyltin difluoride by X-ray diffraction reveals two distinct crystalline species represented by two distinct peaks as shown in FIG. 4(b). Calorimetric analysis reveals a significant secondary endotherm at about 150° C. as shown in FIG. 2(b) in addition to a primary endotherm at about 160° C. as in Example I. Thermogravimetric analysis reveals a primary decomposition temperature of about 290° C. as shown in FIG. 3(b), compared to a decomposition temperature of 280° C. in Example I. This batch of dibutyltin difluoride is believed to contain a significant portion of polymolecular species. The resistivity of the tin oxide film of this example is marginally acceptable. However, the resistivity may be lowered to well within the acceptable range by coating at a slightly higher temperature, about 1200° F. (about 649° C.).

EXAMPLE III

Figure 2C:
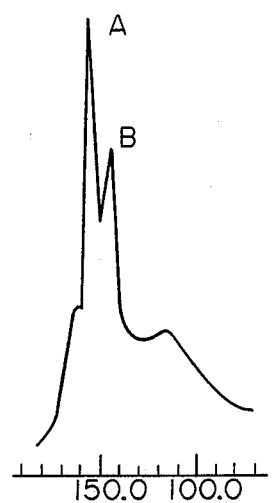
FIG. 2(c) illustrates calorimetric analysis between 70° C. and 180° C. of a sample of dibutyltin difluoride which comprises a substantial proportion of polymolecular species represented by secondary peak B distinguished from primary peak A.
Figure 3C:
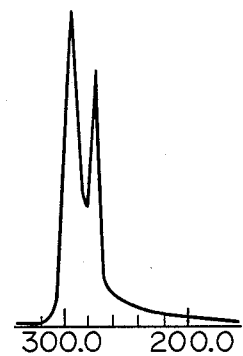
FIG. 3(c) illustrates thermogravimetric analysis between 160° C. and 320° C. of a sample of dibutyltin difluoride which comprises a substantial proportion of polymolecular species represented by a decomposition temperature peak at about 300° C.
Figure 4C:
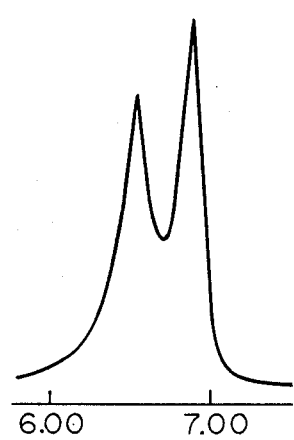
FIG. 4(c) illustrates X-ray diffraction analysis of a sample of dibutyltin difluoride which comprises a substantial proportion of polymolecular species represented by secondary peak B distinguished from peak A.

A float glass ribbon is coated with a tin oxide film as in the previous examples under identical conditions except that a different batch of dibutyltin difluoride is used. A uniform tin oxide coating is deposited on the glass surface. The tin oxide film has an apparent thickness of about 1600 Angstroms as evidenced by a second order blue interference color in reflectance. The resistivity of the tin oxide film of this Example is 35 to 40 ohms per square, quite acceptable for a low emissivity, infrared reflective coated product. Analysis of the dibutyltin difluoride by X-ray diffraction reveals two distinct species represented by two distinct peaks as shown in FIG. 4(c). Calorimetric analysis reveals a substantial secondary endotherm at about 145° C. in addition to a primary endotherm at about 160° C. as shown in FIG. 2(c). Thermogravimetric analysis reveals a primary decomposition temperature of about 300° C. as shown in FIG. 3(c). This batch of dibutyltin difluoride is believed to contain a substantial proportion of polymolecular species.

The above examples are offered to illustrate the present invention. Infrared spectroscopy and elemental analysis indicate no differences in composition among the various batches of dibutyltin difluoride tested, i.e. there is nothing in the compositions but dibutyltin difluoride which could account for the differences in coating performance. Since calorimetric analysis, thermogravimetric analysis and X-ray diffraction all indicate the presence off more than one species, and published literature postulates a two-dimensional network of dibutyltin difluoride, the differences in coating performance found among various batches of dibutyltin difluoride are attributed herein to the presence of different proportions of polymolecular species. Without being bound or limited by it, the following explanation is offered for the desirability of dibutyltin difluoride in what is believed to be polymolecular form.

In the process of forming a film by thermal decomposition of a coating reactant upon contact with a hot surface of a substrate to be coated, one of the steps, which may determine the rate of reaction, is the diffusion of coating reactant through the boundary layer, a quiescent layer of gases at the substrate surface. The advantage of the preferred dibutyltin difluoride compositions of the present invention may result from the higher decomposition temperature which reduces the amount of coating reactant that decomposes before reaching the glass surface. The advantage of the preferred dibutyltin difluoride compositions in accordance with the present invention may also result from increased molecular density, i.e., each polymolecular "molecule" which diffuses through the barrier layer may contain two or more times as much tin and fluorine as monomolecular dibutyltin difluoride. Both of these factors may contribute to increased coating efficiency which results in the deposition of lower resistivity tin oxide films from dibutyltin difluoride compositions comprising a preferred proportion of polymolecular species, all other coating process conditions being equal.

While the present invention is described in detail with respect to dibutyltin difluoride, the advantages may be gained with other organometallic coating reactants, such as dimethyltin difluoride, which similarly exist in more than one form. In the practice of the present invention, various batches of coating reactants may be analyzed in advance to determine which will provide optimum films, so that production time need not be lost adjusting process conditions to compensate for changes in coating reactant batches. The advantages of the preferred dibutyltin difluoride compositions in accordance with the present invention are believed to be attainable whether the coating reactant is utilized in powder, solution or vapor form.

The scope of the present invention is defined by the following claims.

I claim:

1. In a method of forming a metal-containing film on a surface of a substrate by contacting said surface with a dialkyltin difluoride coating reactant at a temperature sufficient to thermally decompose said coating reactant to form a metal-containing film on said surface, the improvement which comprises selecting a composition of said dialkyltin difluoride coating reactant on the basis of a decomposition temperature which is high relative to other compositions for use in said method.

2. The method according to claim 1, wherein said dialkyltin difluoride is dibutyltin difluoride.

3. A method for selecting a composition of dialkyltin difluoride coating reactant having optimum thermal properties for use in a method of forming a metal-containing coating on a surface of a substrate by contacting said surface with said reactant at a temperature sufficient to thermally decompose said reactant comprising the steps of:

a. obtaining various batches of said dialkyltin difluoride coating reactant;

b. thermally analyzing each of said batches of coating reactant to determine its decomposition temperature; and c. selecting at least one batch of said reactant which has a higher thermal decomposition temperature than nonselected batches.

4. A method according to claim 3, wherein said dialkyltin difluoride is dibutyltin difluoride.

* * * * *